(12) United States Patent
Hernandez-Solis et al.

(10) Patent No.: US 7,730,936 B2
(45) Date of Patent: Jun. 8, 2010

(54) ACTIVE CABLE FOR WELLBORE HEATING AND DISTRIBUTED TEMPERATURE SENSING

(75) Inventors: Vladimir Hernandez-Solis, Stafford, TX (US); Montie W. Morrison, Sugar Land, TX (US); Willem A. Wijnberg, Houston, TX (US); Sheng Chang, Sugar Land, TX (US); Joseph Varkey, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 104 days.

(21) Appl. No.: 11/933,550

(22) Filed: Nov. 1, 2007

(65) Prior Publication Data

US 2008/0185138 A1 Aug. 7, 2008

Related U.S. Application Data

(60) Provisional application No. 60/888,723, filed on Feb. 7, 2007.

(51) Int. Cl.
*E21B 36/04* (2006.01)
*E21B 43/24* (2006.01)
(52) U.S. Cl. .......................... 166/60; 166/302; 392/301
(58) Field of Classification Search ............... 166/60, 166/302; 392/301, 305
See application file for complete search history.

(56) References Cited

U.S. PATENT DOCUMENTS

| 2,311,757 | A | | 2/1943 | Jakosky |
| 3,807,227 | A | | 4/1974 | Smith, Jr. |
| 3,864,969 | A | | 2/1975 | Smith, Jr. |
| 3,938,383 | A | | 2/1976 | Sayer |
| 4,008,761 | A | * | 2/1977 | Fisher et al. ................. 166/248 |
| RE30,738 | E | * | 9/1981 | Bridges et al. ............... 166/248 |
| 4,570,715 | A | | 2/1986 | Van Meurs et al. |
| 4,765,182 | A | | 8/1988 | Boone |
| 5,044,769 | A | | 9/1991 | Kulczyk et al. |
| 5,286,109 | A | | 2/1994 | Hanscombe et al. |
| 5,509,097 | A | * | 4/1996 | Tondi-Resta et al. ......... 385/113 |
| 6,269,876 | B1 | * | 8/2001 | De Rouffignac et al. ...... 166/60 |
| 6,419,423 | B1 | * | 7/2002 | Vinegar et al. ........... 405/128.4 |
| 6,497,279 | B1 | | 12/2002 | Williams et al. |
| 6,671,441 | B1 | * | 12/2003 | Bocanegra et al. ........... 385/112 |
| 7,055,604 | B2 | | 6/2006 | Jee et al. |
| 7,240,730 | B2 | | 7/2007 | Williams et al. |

(Continued)

FOREIGN PATENT DOCUMENTS

JP 2001281071 10/2001

(Continued)

*Primary Examiner*—Shane Bomar
(74) *Attorney, Agent, or Firm*—Brandon S. Clark; Rodney V. Warfford

(57) ABSTRACT

A heating and distributed-temperature-sensor cable permanently fixed in a wellbore that permits known amounts of heat to be introduced to subsurface formations and improved temperature measurement thereof. The heat is introduced into a target zone of the wellbore by forming the cable in two sections: an upper section that carries an electrical current without generating significant amounts of heat, and a lower section that generates heat from the electrical current. Continuous distributed-temperature-sensing is performed through measuring various scattering mechanism in optical fibers that run the length of the cable.

13 Claims, 7 Drawing Sheets

U.S. PATENT DOCUMENTS

| | | |
|---|---|---|
| 7,475,724 B2 * | 1/2009 | Pribnow et al. ........ 166/250.01 |
| 2002/0023751 A1 | 2/2002 | Neuroth et al. |
| 2003/0179651 A1 | 9/2003 | Nutt et al. |
| 2004/0129417 A1 | 7/2004 | Nelson et al. |
| 2004/0244970 A1 | 12/2004 | Smith, Jr. |
| 2006/0032637 A1 | 2/2006 | Ayoub et al. |
| 2007/0158064 A1 * | 7/2007 | Pribnow et al. ........ 166/250.01 |

FOREIGN PATENT DOCUMENTS

| | | |
|---|---|---|
| RU | 2231635 | 6/2004 |
| SU | 1574796 | 6/1990 |
| WO | 02086284 A1 | 10/2002 |
| WO | 2005064117 A1 | 7/2005 |

* cited by examiner

6A

6B

ACTIVE CABLE FOR WELLBORE HEATING AND DISTRIBUTED TEMPERATURE SENSING

CROSS REFERENCE TO RELATED APPLICATIONS

This application is a non-provisional claiming priority from provisional application Ser. No. 60/888,723 filed on Feb. 7, 2007, entitled Active Cable for Distributed Temperature Sensing, the teachings of which are incorporated by reference herein as if reproduced in full below.

TECHNICAL FIELD

This invention relates to wellbore cables, and methods of manufacturing and using such cables. More particularly, the invention relates to permanent wellbore heating cables secured in the cement wall of a cased hole, for example, used in conjunction with permanent distributed temperature sensing monitoring cables to analyze formations adjacent a wellbore, as well as uses of such cables.

BACKGROUND OF THE INVENTION

As oil reserves become ever more scarce and difficult to find, improved information on the downhole environment is becoming increasingly crucial to successful exploration and production. Knowledge of downhole temperature fluctuations helps to identify materials and flow rates downhole, and can thus be a particularly promising data set. Under certain temperature and/or pressure conditions, gas hydrates are known to dissociate, form, or be otherwise affected. Better understanding of the parameters of such behavior in the downhole environment will be an important advance toward more efficient exploration and development of underground resources. Specifically, such information would prove very helpful in developing gas hydrates and heavy oils as energy resources. Therefore, collecting and analyzing thermal measurements is important in both static and dynamic characterization of subsurface structures.

The stability of formation fluids, including hydrocarbons such as gas hydrates and heavy oils, is sensitive to variations in pressure and temperature. In this regard, gas hydrates dissociate or form when pressure and/or temperature conditions cross equilibrium borders. Conventional methods to model the thermal properties of subsurface formations (e.g., thermal conductivity, diffusivity and capacity measurements) require taking passive temperature measurements at several underground locations, and then performing core analysis in a laboratory (attempting to duplicate the downhole conditions in the laboratory) and comparing the results. However, laboratory core analysis of hydrate bearing zones is often difficult as the downhole conditions are not easily replicated. Further, the accuracy of the laboratory model is dependent upon factors such as coring conditions due to the dynamic dissociation/formation process of hydrates downhole, compaction factor differences under different pressures, and sometimes upon extrapolating data from missing core samples at certain depth intervals. In addition, when using passive temperature measurements taken at several underground locations downhole, the acquired data are interpreted under certain assumptions that increase the uncertainties (e.g., that heat flow is steady, that thermal disturbances from drilling or mud circulation are negligible).

Several commercial distributed-temperature-sensor (DTS) applications are available that give temperature measurements along the entire length of a cable for fire detection and temperature control in warehouses, and include high-temperature-resistant DTS cables. Such DTS cables consist of fiber-optic loops and use a variety of scattering phenomenon to sense the temperature along the length of the fiber-optic loops. The scattering phenomenon in optical fibers arise because temperature, pressure and tensile forces cause changes to the light frequency scattered by the optical fiber. Such scattering effects include Brillouin scattering, which results from temperature variations and strain within the optical fiber, and Raman scattering, which results only from temperature variations in the optical fiber.

Commercially available DTS equipment is useful in laboratory core analysis, however, applying laboratory-based active temperature measurement methods to in-situ subsurface formation measurement leads to many technical and logistical difficulties. In one example, a DTS cable is lowered into the flow of the completed well and continuous measurements are taken. However, this method reduces flow from the well because the DTS cable is obstructing a portion of the wellbore. Also, temperature measurements are highly influenced by the temperature of the material flowing by, and have less correlation to the property of the formation, itself.

In addition to the desire to accurately measure the temperature along the entire wellbore for better modeling of the subsurface formations, it is sometimes desirable to manipulate the formation fluids, by introducing heat into the wellbore to effect the dissociation or formation of hydrates. This is typically done by lowering a heating element into the wellbore and heating the formation adjacent to the heating element to induce the desired hydrate formation or dissociation. However, this introduces additional obstructions into the wellbore.

From the foregoing it will be apparent that there is a need for apparatus for introducing heat into subsurface formations, for example, for the use with distributed-temperature-sensor cable for subsurface modeling. An apparatus that combines these features would provide additional advantages.

DETAILED DESCRIPTION OF THE INVENTION

Figure 1:
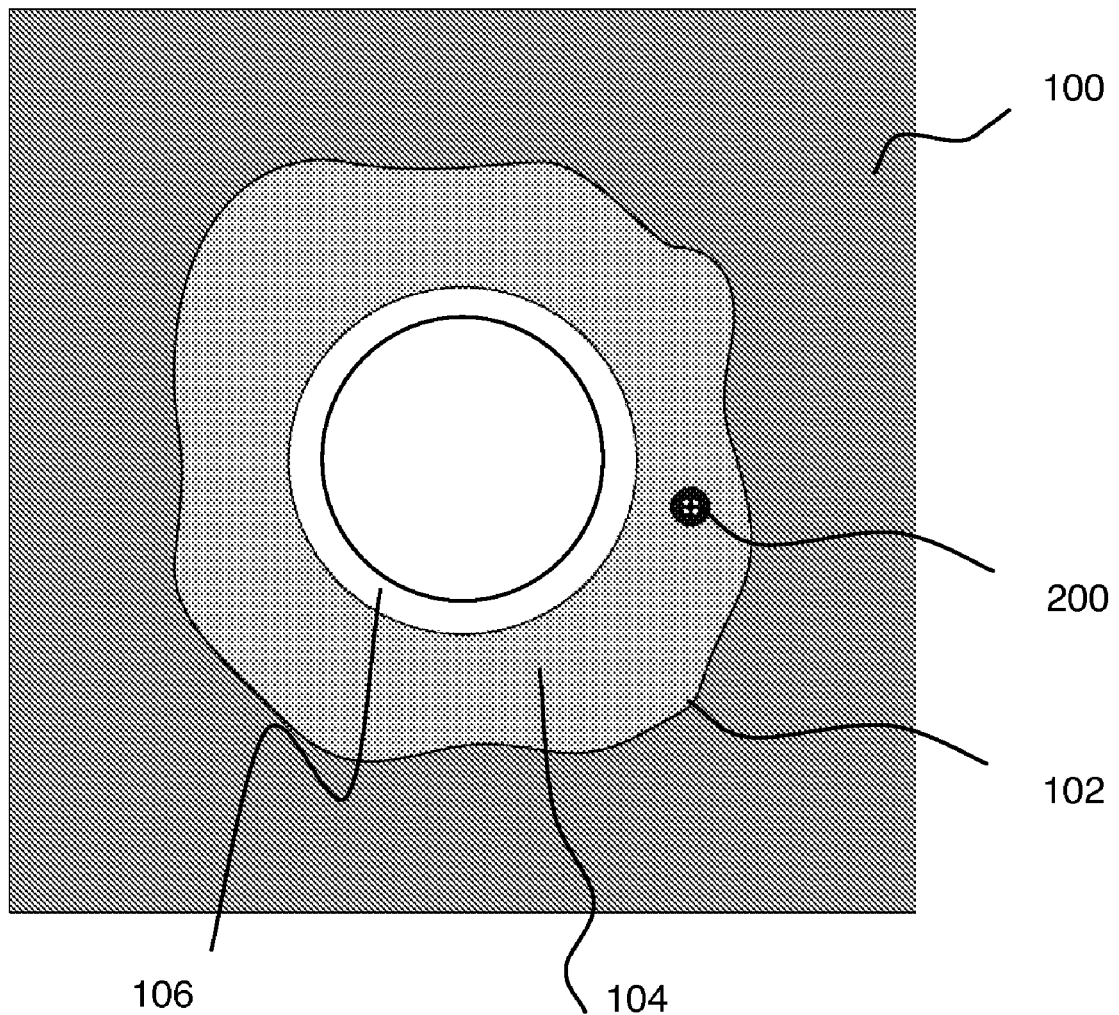
FIG. 1 is a cross-section of a cement-cased well bore illustrating a distributed-temperature-sensor monitoring and heating cable placed in close proximity to the surrounding formation, in the annulus between the wellbore and the well casing, and held in place in cement.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

It should also be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that any cited numerical range listed or described as being useful, suitable, or the like, is intended that any and every point within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

A distributed-temperature-sensor and heating cable as described herein achieves improved temperature measurements of the subsurface formations in a wellbore by being permanently fixed in the wellbore. The heating portion permits greater downhole calibration of the temperature measurements from the distributed-temperature-sensor, leading to better modeling of the subsurface formations. Also, the ability to heat the subsurface structures improves the ability to control hydrate formation and dissociation.

Introduction

As shown in the drawings for the purposes of illustration, this invention relates to wellbore cables, and methods of manufacturing and using such cables. In one aspect, the invention relates to permanent distributed-temperature-sensor monitoring and heating cables secured in the cement wall of a cased hole to analyze formations adjacent a wellbore, methods of manufacturing same, as well as uses of such cables. Such permanent monitoring cables are capable of continuous distributed-temperature-sensing as well as active heating to create controlled, known temperature disturbances in the downhole environment. By analyzing subsurface changes in response to these actively produced disturbances, advances are anticipated in the accuracy of downhole characterization.

The cables described herein include a means of applying a known amount of heat to the downhole formation at a desired depth. Such cables are said to be "active". The cables may be active along their entire length, or along only a portion of their length. A cable that is active along only a portion of its length is designed in two sections. In one section, typically the upper section, low resistivity conductors such as copper are sized, insulated and applied at a lay angle such that a negligible amount of heat is dissipated when the design range of currents is applied. In the "active" section, typically the lower section, the conductor material is changed to a higher resistivity conductor such as steel and the size, insulation and lay angle are changed such that the design range of currents will generate heat when applied. Applying different currents within the design range generates known, pre-calibrated amounts of heat within the active cable section. This allows for "laboratory-type" accuracy in thermal manipulation in an in-situ environment. Cables according to this invention may function solely as wellbore heating cables, or may be constructed such that the cable performs additional functions, such as distributed-temperature-sensing.

One embodiment of the permanent monitoring cables includes optical fibers to perform distributed temperature sensing. Light signals in optical fibers are subject to different scattering mechanisms. Raman scattering is observed as backscatter as a result of temperature differences in the optical fiber. Brillouin scattering fluctuates in reaction to a combination of temperature changes and strain placed on the optical fiber. This invention uses Raman or Brillouin scattering in optical fibers to measure distributed temperatures along a permanent monitoring cable installed in a downhole environment (see, e.g., *Thermal Effects of Brillouin Gain Spectra in Single-Mode Fibers*, Toshio Kurashima, et. al, IEEE Photonics Technology Letters, Vol. 2, No. 10, Oct., 1990, which is herein incorporated by reference). When light pulses transmitted along the fibers encounter increased temperatures, the "scattered" impulses are transmitted back to the origin of the pulse. Because the speed of light is constant, these scattered impulses allow not only for temperature to be measured but can pinpoint the location of those temperatures.

FIG. 1 is a cross-section of a cement-cased well bore illustrating a combination heating and distributed-temperature-sensor monitoring cable 200 placed in close proximity to the surrounding formation 100, in the annulus between the wellbore 102 and the well casing 106, and held in place in cement 104. Through placement in the cement surrounding the well casing, the cable 200 is available for use during the entire lifetime of the cased hole.

Heating/DTS Cable w/Return Conductors

Figure 2:
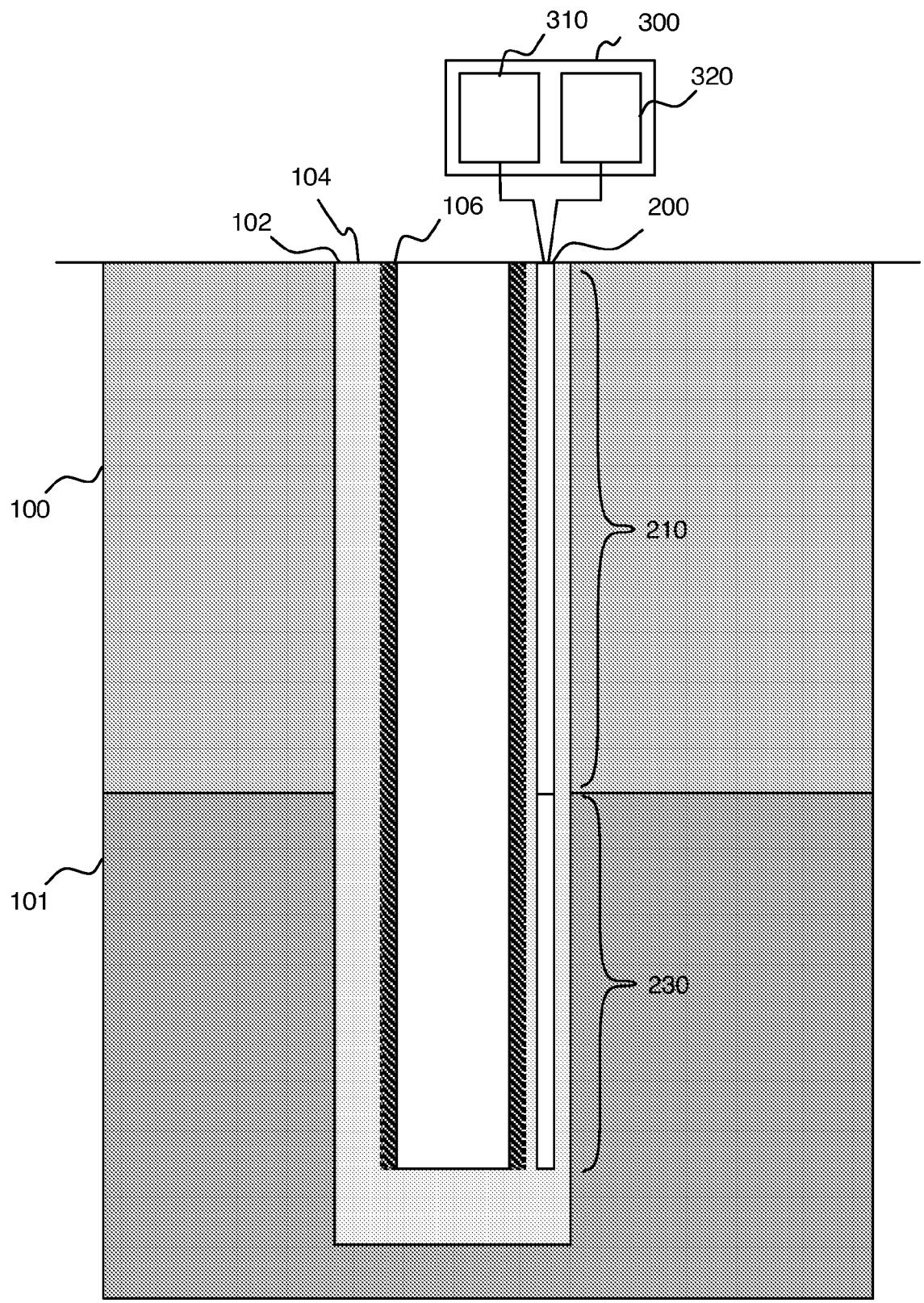
FIG. 2 is a schematic illustration of one embodiment of a distributed-temperature-sensor monitoring and heating cable in the annulus between the wellbore and the well casing with associated temperature monitoring and heating equipment.

FIG. 2 is a block diagram illustrating one embodiment of a combination heating and distributed-temperature-sensor monitoring cable (hereinafter referred to as Heating/DTS cable) 200 permanently placed in the cement 104 in the annulus between the wellbore 102 and the well casing 106, and connected to control equipment 300 that includes the distributed-temperature-sensor equipment 310 that detects the Raman and Brillouin scattering in the Heating/DTS cable 200 and the heater current control equipment 320 that controls the current in the conductors. The Heating/DTS cable 200 has an upper section 210 and a lower section 230. The lower section 230 corresponds to a lower region of the subsurface formation 101 where greater distributed-temperature-sensor accuracy and addition of heat are desired. The upper section 210 is primarily used to deliver power to the lower section 230.

FIGS. 3A and 3B are cross-sectional views of the upper section 210 and lower section 230 of the Heating/DTS cable 200, respectively, both in a plane perpendicular to the length of the cable. In the upper section 210, the upper conductors 212 (eight are shown in the present example) are copper and are sized 214, insulated 216 and applied at a relatively low lay angle 218, as illustrated in FIG. 4A, such that they dissipate a very low amount of heat in transmitting the design range of currents through the Heating/DTS cable 200. In the lower (active) section 230, the lower conductors 232 (again, eight are shown in the present example) are steel and are sized 234, insulated 236 and applied at a relatively high lay angle 238, as illustrated in FIG. 4A, such that the design range of currents will generate heat when applied. The higher resistivity of the lower conductors 232 means that the designed range of currents will produce more heat per unit length of lower conductor 232 than is generated by the upper conductors 212. The higher lay angle 238 in the lower section 210 results in greater coverage by the lower conductors 232 (i.e. the length of lower conductors 232 per length of lower section 230 is greater than the length of upper conductors 212 per length of upper section 210). This combination of higher resistivity of the lower conductors 232 and the higher lay angle 238 in the lower section 230 means that the lower section 230 acts as a heating element. Applying different currents within the design range will generate known, pre-calibrated amounts of heat within the lower section 230. This will allow for "laboratory-type" accuracy in thermal manipulation and monitoring in an in-situ environment.

Electrical current return is through a layer of copper return conductors 258 that run the entire length of the Heating/DTS cable 200 (i.e., the return conductors 258 run through both the upper section 210, and the lower section 230). The return conductors 258 are cabled over the steel tube 254 (described below) at the cable core. The return conductors 258 are also sized and insulated such that a minimal amount of heat is generated when the design range of currents is applied. FIG. 4B shows schematically the connection between the upper conductors 212, the lower conductors 232 and the return conductors 258. Here, each upper conductor 212 is series connected to a lower conductor 232. At the bottom of the Heating/DTS cable 200, all of the lower conductors 232 are gang connected together and are in turn gang connected to the return conductors 258.

The Heating/DTS cable 200 has one or more lengths of optical fiber 250 running the entire length of the Heating/DTS cable 200 to act as distributed temperature sensors. The distributed temperature sensors can function with a single length of optical fiber 250 as an open ended system, or in pairs of optical fibers 250 formed into loops. The present example has four optical fibers running the length of the Heating/DTS cable 200, and connected as illustrated in FIG. 4B to form the two loops of optical fiber 250. The loops of optical fiber 250 are connected to the distributed-temperature-sensing equipment 310 to collect temperature data in the downhole environment. The loops of optical fiber 250 are placed inside a steel tube 254 in either air, or a suitable filler 252 like polyolefin. The steel tube 254 runs the entire length of the Heating/DTS cable 200. Use of a filler 252 improves heat dissipation, prevents water migration and improves the mechanical stability of the loops of optical fiber 250. When a filler 252 is used, the Heating/DTS cable 200 can be constructed such that the length of the loops of optical fiber 250 is slightly longer than the length of the surrounding steel tube 254. For example, every 10 feet of Heating/DTS cable 200 can be constructed with a corresponding 10 feet of steel tube 254, but with a corresponding 10.01 feet of optical fiber loop 250 that is held in place by the filler 252. In this way, much less strain is placed upon the optical fiber loops 250 and the commensurate strain effect of the Brillouin scattering is reduced, producing a more accurate temperature measurement.

Outside the steel tube 254, an inner layer of polymer 256 like EPC is extruded. On top of the inner layer of polymer 256, a layer of soft thermoplastic elastomer 257 like Santoprene® (a thermoplastic manufactured by ExxonMobil) is extruded. The inner layer of polymer 256 and the layer of soft thermoplastic elastomer 257 bond to each other. The return conductors 258 are embedded into the layer of soft thermoplastic elastomer 257. Next, a middle layer of soft thermoplastic elastomer 260 is applied over the return conductors 258, sealing the return conductors 258 and binding to the inner layer of soft thermoplastic elastomer 257.

In the upper section 210 of the Heating/DTS cable 200, the upper conductors 212 are insulated 214 with suitable polymers like polyurethanes or fluoropolymers, and are cabled over and slightly imbedded into the middle layer of soft thermoplastic elastomer 260. The insulation 216 does not bond to the middle layer of soft thermoplastic elastomer 260. In the lower section 230 of the Heating/DTS cable 200, the lower conductors 232 are insulated 236 with suitable high-temperature resistant polymer or fluoropolymer (e.g., Tefzel, EPC, PFA, MFA, PTFE, etc.), and are cabled over and slightly imbedded into the middle layer of soft thermoplastic elastomer 260. The insulation 236 does not bond to the middle layer of soft thermoplastic elastomer 260.

In both the upper section 210 and the lower section 230 of the Heating/DTS cable 200, an outer layer of soft thermoplastic elastomer 262 is extruded over the insulated conductors 212 and 232 to complete the cable core. The outer layer of soft thermoplastic elastomer 262 bonds to the middle layer of soft thermoplastic elastomer 260, but does not bond to the polymer-insulated conductors 212 and 232.

A thin inner jacket layer 264 of polymeric material (e.g., nylon) is extruded over the outer layer of soft thermoplastic elastomer 262. The inner jacket layer 264 may bond to the outer layer of soft thermoplastic elastomer 262. Steel strength wires 266 are cabled over and slightly imbedded into the inner jacket layer 264. An outer jacket layer 268 of polymeric material is extruded over the strength wires 266, and bonds to the inner jacket layer 264. The polymer used for the inner jacket layer 264 and the outer jacket layer 268 is of a polymeric material that bonds to the concrete 104 in the cased hole 106.

Heating/DTS Cable w/Out Return Conductors

Figure 5:
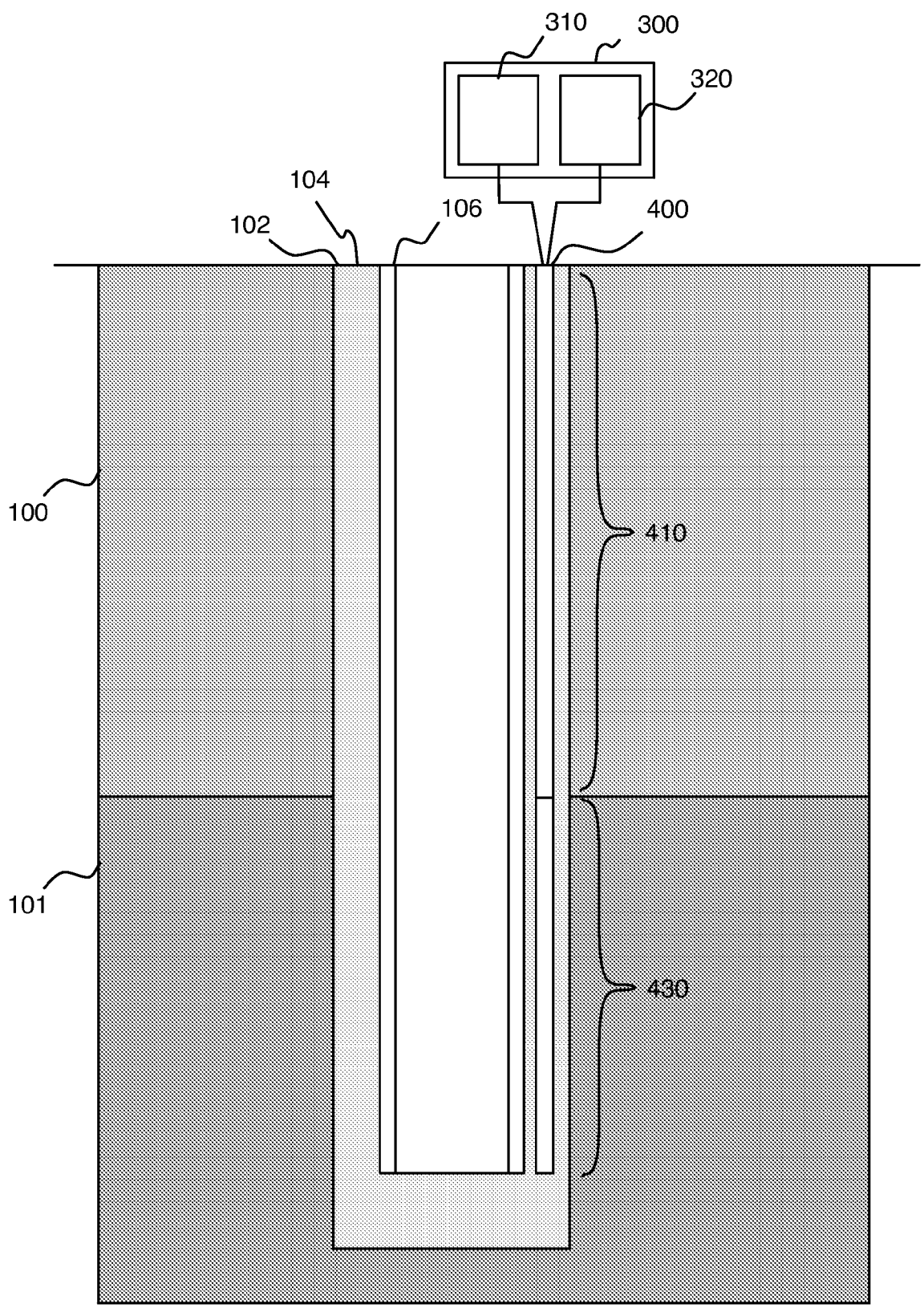
FIG. 5 is a schematic illustration of a different embodiment of a distributed-temperature-sensor monitoring and heating cable in the annulus between the wellbore and the well casing with associated temperature monitoring and heating equipment.
Figure 6:
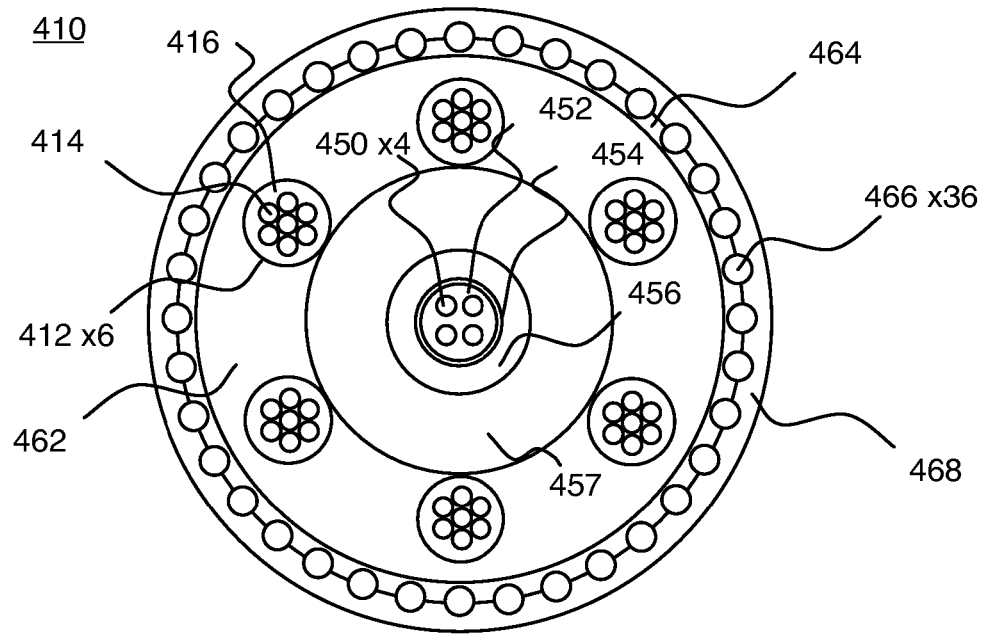
FIGS. 6A and 6B are cross-sectional views of the upper section and lower section of the distributed-temperature-sensor monitoring and heating cable of FIG. 5.
Figure 6:
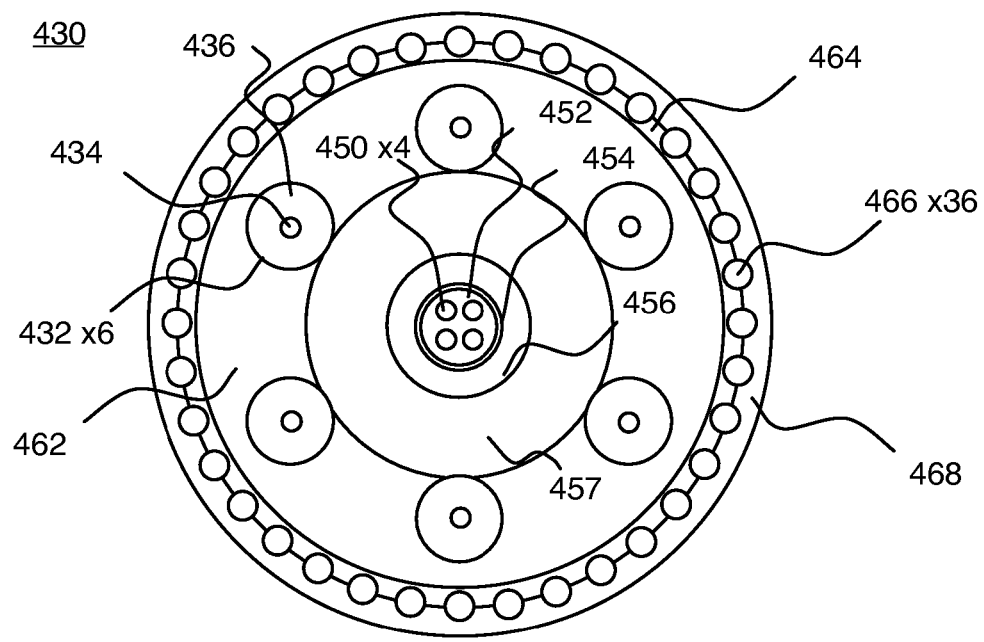
Figure 7:
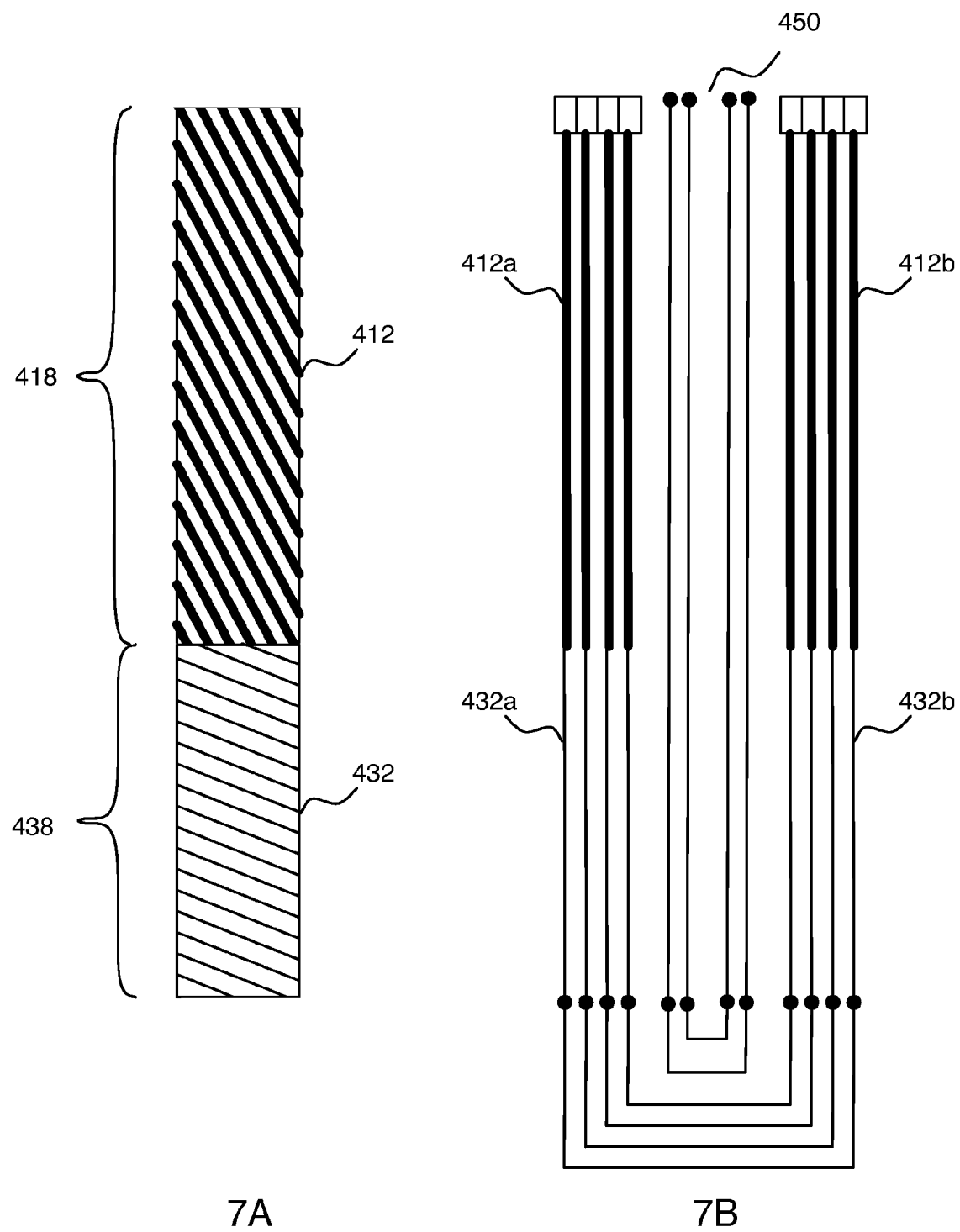
FIG. 7A is a schematic illustration of the lay angles of the conductors of in the distributed-temperature-sensor monitoring and heating cable of FIG. 5.
FIG. 7B is a schematic illustration of the connection between the conductors in the distributed-temperature-sensor monitoring and heating cable of FIG. 5.

FIG. 5 shows an alternative embodiment of a heating and distributed-temperature-sensor monitoring cable (hereinafter referred to as Heating/DTS cable) 400 permanently placed in the cement 104 in the annulus between the wellbore 102 and the well casing 106, and the associated control equipment 300 including the distributed-temperature-sensor equipment 310, and the heater current control equipment 320. The Heating/DTS cable 400 has an upper section 410 and a lower section 430. The lower section, 430 corresponds with a lower region of the subsurface formation 101 where greater distributed-temperature-sensor accuracy and addition of heat are desired. This Heating/DTS cable 400 is similar in construction and usage as the Heating/DTS cable 200 described above, in that the Heating/DTS cable 400 has an upper section 410 and a lower section 430. FIGS. 6A and 6B show the cross section of the upper section 410 and lower section 430 of the Heating/DTS cable 400, respectively. The major difference is that the Heating/DTS cable 400 has no return conductors 258. Instead, the supply current runs through half of the conductors 412a and 432a and the return current runs through the other half of the conductors 412b and 432b. FIG. 7A shows schematically the connections. Here, each upper conductor 412a is series connected to a corresponding lower conductor 432a and each upper conductor 412b is series connected to a corresponding lower conductor 432b. At the bottom of the Heating/DTS cable 400, each lower conductor 432a is connected to one, and only one, lower conductor 432b. Thus, the heating current flows down an upper conductor 412a and down the corresponding lower conductor 432a and then flows back up the connected lower conductor 432b and back up the corresponding upper conductor 412b. As illustrated in FIG. 7B, the lay angle 418 of the upper conductors 412 is lower than the lay angle 438 of the lower conductors 432.

The Heating/DTS cable 400 has one or more lengths of optical fiber 450, as illustrated in FIG. 7A, running the entire length of the Heating/DTS cable 400 to act as distributed temperature sensors in either the open ended or looped mode. The present example has four optical fibers running the length of the Heating/DTS cable 400, and connected as illustrated in FIG. 7B to form the two loops of optical fiber 450. Again, the loops of optical fiber 450 are placed inside a steel tube 454 in either air, or a suitable filler 452. Outside the steel tube 454, an inner layer of polymer 456 like EPC is extruded. On top of the inner layer of polymer 456, a layer of soft thermoplastic elastomer 457 is extruded. The inner layer of polymer 456 and the layer of soft thermoplastic elastomer 457 bond to each other. In the upper section 410 of the Heating/DTS cable 400, the upper conductors 412 are cabled over and slightly imbedded into the inner layer of soft thermoplastic elastomer 457. The insulation 414 does not bond to the inner layer of soft thermoplastic elastomer 457. In the lower section 430 of the Heating/DTS cable 400, the lower conductors 432 are cabled over and slightly imbedded into the inner layer of soft thermoplastic elastomer 457. The insulation 434 does not bond to the inner layer of soft thermoplastic elastomer 457. Next, in both the upper section 410 and the lower section 430 of the Heating/DTS cable 400, an outer layer of soft thermoplastic elastomer 462 is extruded over the insulated conductors 412 and 432 to complete the cable core. Finally a thin inner jacket layer 464 of polymeric material is extruded over the outer layer of soft thermoplastic elastomer 462, steel strength wires 466 are cabled over and an outer jacket layer 468 of polymeric material is extruded over the strength wires 466, bonding to the inner jacket layer 464.

Heating Example

Figure 3:
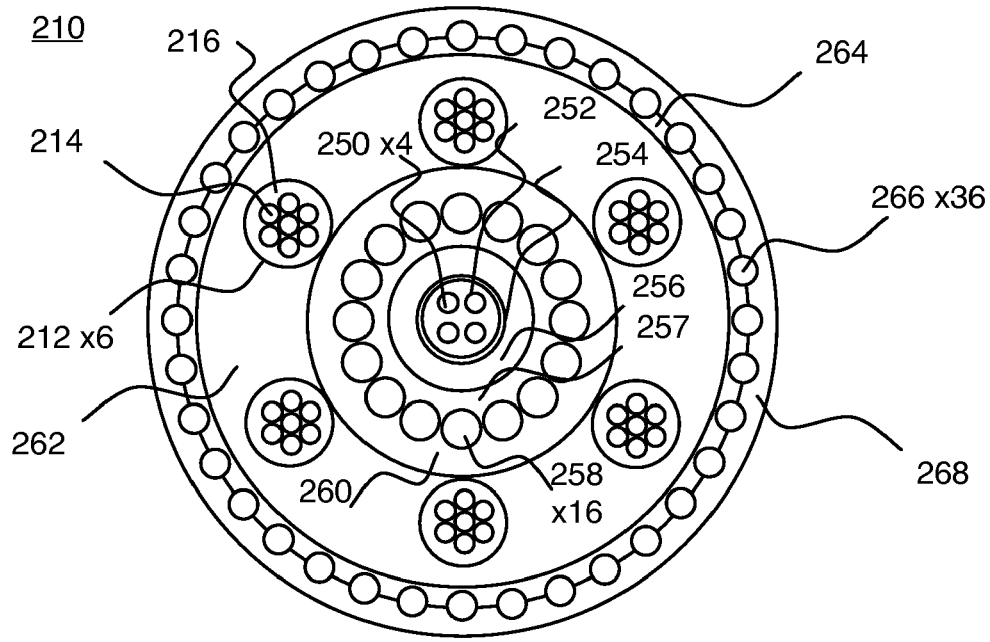
FIGS. 3A and 3B are cross-sectional views of the upper section and lower section of the distributed-temperature-sensor monitoring and heating cable of FIG. 2.
Figure 3:
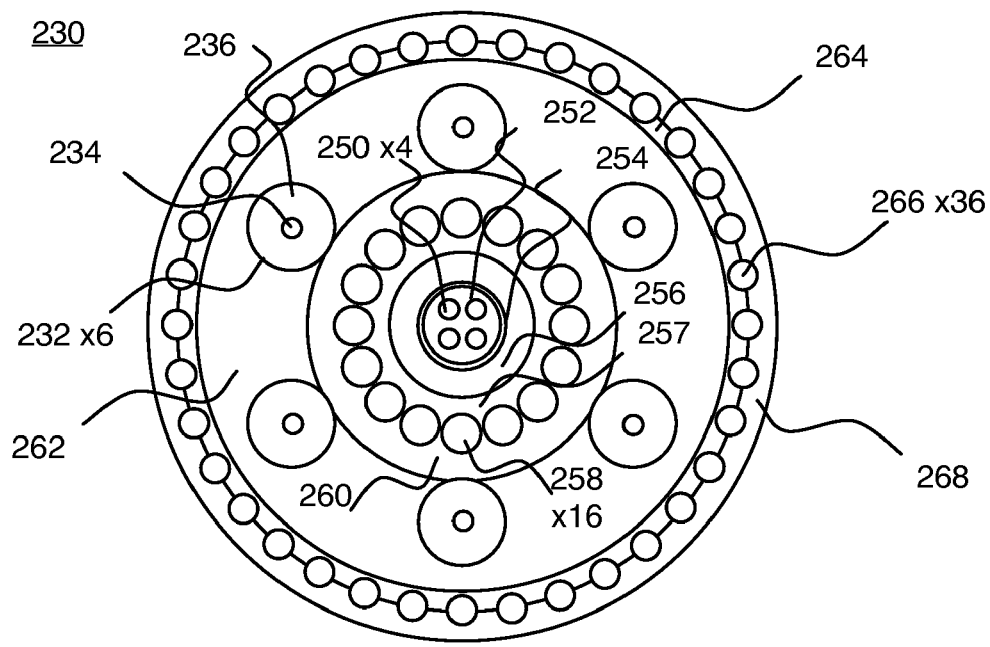
Figure 4:
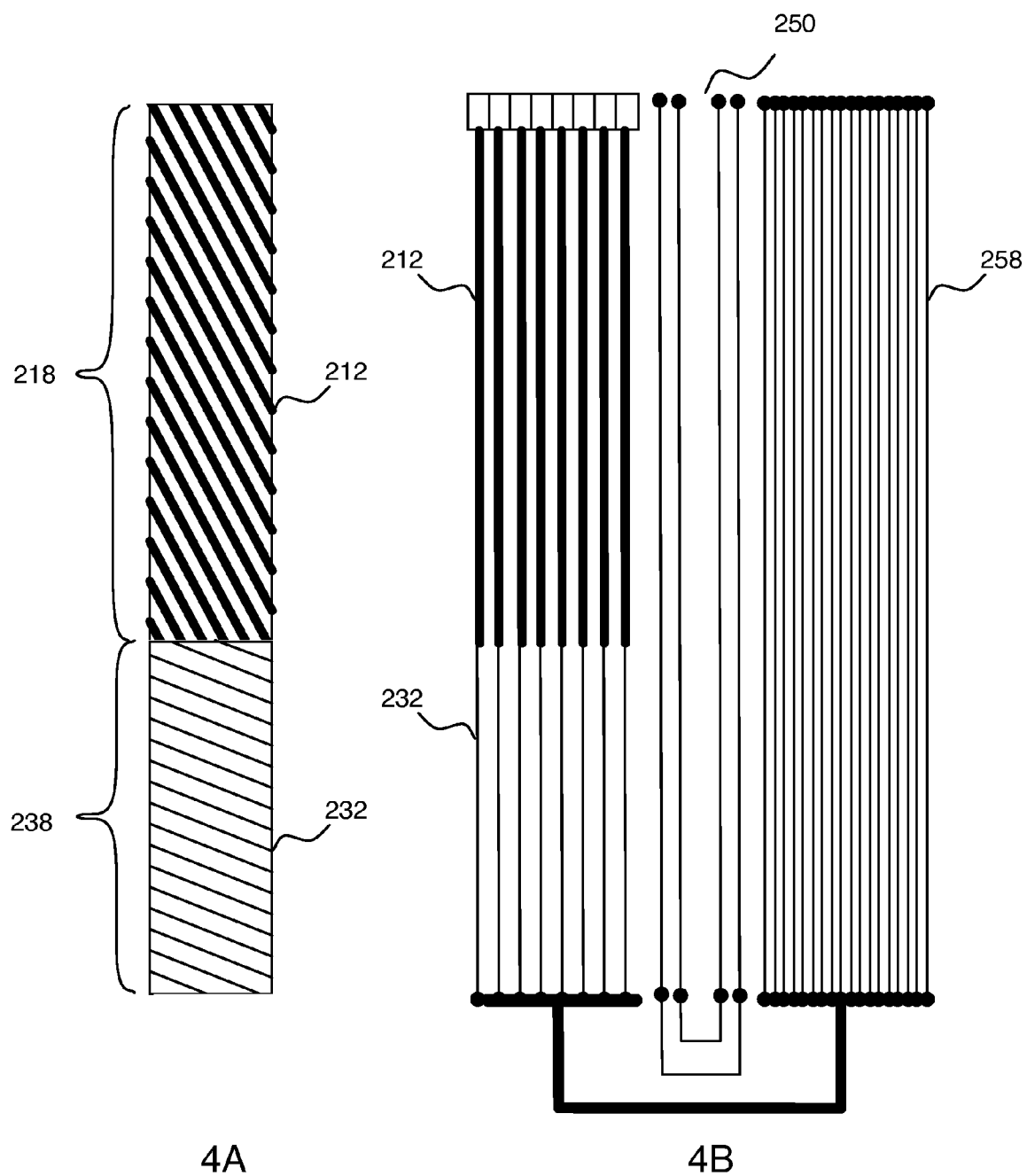
FIG. 4A is a schematic illustration of the lay angles of the conductors of in the distributed-temperature-sensor monitoring and heating cable of FIG. 2.
FIG. 4B is a schematic illustration of the connection between the conductors in the distributed-temperature-sensor monitoring and heating cable of FIG. 2.

In the following discussions, references will be exclusively related to the Heating/DTS cable 200 and associated features as shown in FIGS. 2 and 3. However, the characteristics described apply equally to the Heating/DTS cable 400. As described above, the upper conductors 212 are set at a low lay angle 218 and are sized 214 such that they dissipate a very low amount of heat in transmitting the design range of currents through the cable. The low lay angle 218 means that the surface area of the upper section 210 is sparsely underlain by the upper conductors 212 (i.e., a given length of upper conductor 212 is in proximity to a large surface area of the Heating/DTS cable 200). The size 214 is a relatively large gage so that the overall resistance of the upper conductors 212 is small. Thus, when the design-specified current is applied to the upper conductors 212, a negligible amount of heat is generated. In the lower section 230, the lower conductors 232 are sized 234 at a smaller gauge and applied at a relatively high lay angle 238. The smaller size 234 means that the overall resistance of the lower conductors is high. The higher lay angle 238 results in greater coverage of the surface area of the lower section 230 by the lower conductors 232. Thus, in the lower section 230, when the design-specified current is applied, the lower section 230 acts as a heater element, allowing the cable to be heated to known temperatures at known depths The equations below are used to calculate the amount of power dissipated along the upper section 210 and the lower section 230 of the Heating/DTS cable 200. Equation 1 gives the general equation for power dissipation, in Watts per unit length of Heating/DTS cable 200. Equation 1 factors in the conductor material parameters; resistivity (ρ) in Ohm-meters, and cross-sectional area of the wires (A) in meters-squared. Cabling configuration is also factored in: the number of wires (N), and loss factor (l) (a parameter that is used to derive the real conductor length from the "linear" or "straight cable" value). Finally, the desired current (I) in the Heating/DTS cable 200 is a factor.

Equation 1: General equation for power dissipated along the cable $$P\left[\frac{\text{Watts}}{\text{unit distance}}\right] = \frac{\rho I^2}{A}(n)(l_f)$$

where:

ρ=Resistivity of the material [Ω● unit distance]

I=Electrical current [Amps]

n=Number of wires involved

A=Area of one of the wires involved $l_f$=Loss factor due to cabling

Equation 2 applies Equation 1 to the upper section 210 of the Heating/DTS cable 200, and Equation 3 applies Equation 1 to the lower section 230. At the design current, steel (the material in the lower conductors 232) has about one tenth the resistivity of copper (the material in the upper conductors 212), the size 214 of the upper conductors 212 is typically around nine times the size 234 of the lower conductors 232, and the loss factor for the upper conductors 212 is approximately ⅕ lower than the loss factor of the lower conductors 232. Taken together, the resistivity in the lower conductors 232 is about one per cent of the resistivity of the upper conductors 212. This means that the lower conductors 232 will generate significantly more heat than the upper conductors 212 will generate for the same current.

$$P_{upper}\left[\frac{\text{Watts}}{\text{unit distance}}\right] = \frac{\rho_{Cu}I^2}{A_{Cu}}(n)(l_{f_{Cu}})$$ Resistivity of Upper Section — Equation 2

$$P_{heater}\left[\frac{\text{Watts}}{\text{unit distance}}\right] = \frac{\rho_{steel}I^2}{A_{steel}}(n)(l_{f_{steel}})$$ Resistivity of Lower Section — Equation 3

The increment in power dissipated from the upper to the lower section can be illustrated in the following example. Table 1 gives the typical parameters for a Heating/DTS cable 200 with copper upper conductors 212 and steel lower conductors 232. Using the parameters for Copper wire, the power dissipated in the upper section 210 ($P_{upper}$) is 0.43 Watts per meter, and the power dissipated in the lower section 230 ($P_{lower}$) is 37.38 Watts per meter. Thus, the power dissipation in the lower section 230 is approximately 87 times greater than the power dissipation in the upper section 210.

TABLE 1

Power Dissipation Example

| Parameter | Value | Units |
|---|---|---|
| Copper - Resistivity ($\rho_{Cu}$) | 1.9111E-08 | $\Omega \cdot m$ |
| Copper - Wire Area ($A_{Cu}$) | 8.1949E-07 | $m^2$ |
| Copper - Loss Factor ($l_{fCu}$) | 1.0361 | |
| Steel - Resistivity ($\rho_{Steel}$) | 1.9192E-07 | $\Omega \cdot m$ |
| Steel - Wire Area ($A_{Steel}$) | 1.1401E-07 | $m^2$ |
| Steel - Loss Factor ($l_{fSteel}$) | 1.2337 | |
| Current (I) | 1.5 | Amps |
| Number of Wires (n) | 8 | |

Manufacturing Considerations

In the following discussion of manufacturing considerations for distributed-temperature-sensor monitoring and heating cables, reference will be made to the Heating/DTS cable 200, unless otherwise indicated. However, the embodiments described are not limited in application to only the Heating/DTS cable 200.

Other embodiments of the distributed-temperature-sensor monitoring and heating cable include one or more conductors. While any suitable number of conductors may be used, any number from 1 to about 60 is typical. Some preferred configurations include 7, 19, or 37 conductors. Any suitable metallic material may be used for the conductors (e.g., copper, nickel coated copper, aluminum, steel). The preferred material for the upper conductors 212 and the return conductors 258 is copper, while the preferred material for the lower conductors 232 is steel. The conductors 212, 232 or 258 may be encased in an insulated jacket. The insulated jacket can by of a stacked dielectric type, with electric field suppressing characteristics, such as those used in the cables described in U.S. Pat. No. 6,600,108 (Mydur, et al.), hereinafter incorporated by reference. Such stacked dielectric insulated conductors generally include a first insulating jacket layer disposed around the metallic conductors wherein the first insulating jacket layer has a first relative permittivity, and, a second insulating jacket layer disposed around the first insulating jacket layer and having a second relative permittivity that is less than the first relative permittivity. The first relative permittivity is within a range of about 2.5 to about 10.0, and the second relative permittivity is within a range of about 1.8 to about 5.0.

One or more loops of optical fiber 250 is preferred. The loops of optical fibers 250 may be multi mode or single mode optical fibers. The loops of optical fibers 250 may be encased in an insulated jacket.

The various components in the Heating/DTS cable 200, such as conductors, optical fibers (as either single optical fibers, or as loops), armor wires and filler, according to the invention, may be positioned at zero helix angle or any suitable helix angle relative to the center axis of the cable. Typically, a central insulated conductor is positioned at zero helix angle, while those components surrounding the central insulated conductor are helically positioned around the central insulated conductor at desired helix angles. A pair of layered armor wire layers may be contra-helically wound (i.e., positioned at opposite helix angles).

Any suitable polymeric material may be used in the Heating/DTS cable 200, including, but not limited to, polyolefins (such as EPC or polypropylene), polytetrafluoroethylene-perfluoromethylvinylether polymer (MFA), perfluoro-alkoxyalkane polymer (PFA), polytetrafluoroethylene polymer (PTFE), ethylene-tetrafluoroethylene polymer (ETFE), ethylene-propylene copolymer (EPC), poly(4-methyl-1-pentene) (TPX® available from Mitsui Chemicals, Inc.), fluorinated ethylene propylene (FEP) polymers, other fluoropolymers, polyaryletherether ketone polymer (PEEK), polyphenylene sulfide polymer (PPS), polytetrafluoroethylene-perfluoromethylvinylether (MFA) polymers modified polyphenylene sulfide polymer, polyether ketone polymer (PEK), maleic anhydride modified polymers, Parmax® SRP polymers (self-reinforcing polymers manufactured by Mississippi Polymer Technologies, Inc based on a substituted poly (1,4-phenylene) structure where each phenylene ring has a substituent R group derived from a wide variety of organic groups), Parmax®, or the like, and any mixtures thereof, and may further include wear resistance particles or even short fibers.

The Heating/DTS cable 200 may further include at least one layer of armor wires, or strength members, surrounding the insulated conductor. These may be generally made of any high tensile strength material including, but not necessarily limited to, galvanized improved plow steel, alloy steel, or the like. A protective polymeric coating may be applied to each or any of the armor wires for corrosion protection or even to promote bonding between the armor wire and the polymeric material disposed in the interstitial spaces. As used herein, the term bonding is meant to include chemical bonding, mechanical bonding, or any combination thereof. Examples of coating materials which may be used include, but are not necessarily limited to, fluoropolymers, fluorinated ethylene propylene (FEP) polymers, ethylene-tetrafluoroethylene polymers (Tefzel®), perfluoro-alkoxyalkane polymer (PFA), polytetrafluoroethylene polymer (PTFE), polytetrafluoroethylene-perfluoromethylvinylether polymer (MFA), polyaryletherether ketone polymer (PEEK), or polyether ketone polymer (PEK) with fluoropolymer combination, polyphenylene sulfide polymer (PPS), PPS and PTFE combination, latex or rubber coatings, and the like. Each armor wire may also be plated with materials for corrosion protection or even to promote bonding between the armor wire and polymeric material. Nonlimiting examples of suitable plating materials include brass, copper alloys, and the like. Plated armor wires may even be cords such as tire cords. While any effective thickness of plating or coating material may be used, a thickness from about 10 microns to about 100 microns is preferred. The armor wires/strength members may be formed of stranded filaments, such as in a wire rope design. Also, the armor wires/strength members may be of a bimetallic or composite construction.

The materials forming the polymeric materials used in the Heating/DTS cable 200 may further include a fluoropolymer additive, or fluoropolymer additives, in the material admixture to form the cable. Such additive(s) may be useful to produce long cable lengths of high quality at high manufacturing speeds. Suitable fluoropolymer additives include, but are not necessarily limited to, polytetrafluoroethylene, perfluoroalkoxy polymer, ethylene tetrafluoroethylene copolymer, fluorinated ethylene propylene, perfluorinated poly(ethylene-propylene), and any mixture thereof. The fluoropolymers may also be copolymers of tetrafluoroethylene and ethylene and optionally a third comonomer, copolymers of tetrafluoroethylene and vinylidene fluoride and optionally a third comonomer, copolymers of chlorotrifluoroethylene and ethylene and optionally a third comonomer, copolymers of hexafluoropropylene and ethylene and optionally third comonomer, and copolymers of hexafluoropropylene and vinylidene fluoride and optionally a third comonomer. The fluoropolymer additive should have a melting peak temperature below the extrusion processing temperature, and preferably in the range from about 200° C. to about 350° C. To prepare the admixture, the fluoropolymer additive is mixed with the insulating jacket or polymeric material. The fluoropolymer additive may be incorporated into the admixture in the amount of about 5% or less by weight based upon total weight of admixture, preferably about 1% by weight based or less based upon total weight of admixture, more preferably about 0.75% or less based upon total weight of admixture.

Polymeric materials are disposed in the interstitial spaces formed between armor wires, and interstitial spaces formed between the armor wire layer and insulated conductor. While the current invention is not particularly bound by any specific functioning theories, it is believed that disposing a polymeric material throughout the armor wires interstitial spaces, or unfilled annular gaps, among other advantages, prevents dangerous well gases from migrating into and traveling through these spaces or gaps upward toward regions of lower pressure, where it becomes a fire, or even explosion hazard. In cables according to the invention, the armor wires are partially or completely sealed by a polymeric material that completely fills all interstitial spaces, therefore eliminating any conduits for gas migration. The polymeric material may also serve as a filter for many corrosive fluids. By minimizing exposure of the armor wires and preventing accumulation of corrosive fluids, the useful life of the cable may be significantly greatly increased.

Also, filling the interstitial spaces between armor wires and separating the inner and outer armor wires with a polymeric material reduces point-to-point contact between the armor wires, thus improving strength, extending fatigue life, and while avoiding premature armor wire corrosion. Because the interstitial spaces are filled the cable core is completely contained and creep is mitigated, and as a result, cable diameters are much more stable and cable stretch is significantly reduced. The creep-resistant polymeric materials used in this invention may minimize core creep in two ways: first, locking the polymeric material and armor wire layers together greatly reduces cable deformation; and secondly, the polymeric material also may eliminate any annular space into which the cable core might otherwise creep. The Heating/DTS cable 200 may improve problems encountered with caged armor designs, since the polymeric material encapsulating the armor wires may be continuously bonded it cannot be easily stripped away from the armor wires. Because the processes used in this invention allow standard armor wire coverage (93-98% metal) to be maintained, cable strength may not be sacrificed in applying the polymeric material, as compared with typical caged armor designs.

In some embodiments of the invention, the polymeric material may not have sufficient mechanical properties to withstand high pull or compressive forces as the cable is pulled, for example, over sheaves, and as such, may further include short fibers. While any suitable fibers may be used to provide properties sufficient to withstand such forces, examples include, but are not necessarily limited to, carbon fibers, fiberglass, ceramic fibers, Kevlar® fibers, Vectran® fibers, quartz, nanocarbon, or any other suitable material. Further, as the friction for polymeric materials including short fibers may be significantly higher than that of the polymeric material alone, an outer jacket of polymeric material without short fibers may be placed around the outer periphery of the cable so the outer surface of cable has low friction properties.

The polymeric material used to form the polymeric jacket or the outer jacket of the Heating/DTS cable 200 according to the invention may also include particles that improve cable wear resistance as it is deployed in wellbores. Examples of suitable particles include Ceramer™, boron nitride, PTFE, graphite, nanoparticles (such as nanoclays, nanosilicas, nanocarbons, nanocarbon fibers, or other suitable nano-materials), or any combination of the above.

The Heating/DTS cable 200 may also have one or more armor wires replaced with coated armor wires. The coating may be comprised of the same material as those polymeric materials described hereinabove. This may help improve torque balance by reducing the strength, weight, or even size of the outer armor wire layer, while also improving the bonding of the polymeric material to the outer armor wire layer.

In some embodiments of the invention, The Heating/DTS cable 200 may comprise at least one filler rod component in the armor wire layer. In such cables, one or more armor wires are replaced with a filler rod component, which may include bundles of synthetic long fibers or long fiber yarns. The synthetic long fibers or long fiber yarns may be coated with any suitable polymers, including those polymeric materials described hereinabove. The polymers may be extruded over such fibers or yarns to promote bonding with the polymeric jacket materials. This may further provide stripping resistance. Also, as the filler rod components replace outer armor wires, torque balance between the inner and outer armor wire layers may further be enhanced.

The Heating/DTS cable 200 may have an outer diameter from about 1 mm to about 500 mm, and preferably, a diameter from about 2 mm to about 250 mm.

The Heating/DTS cable 200 may include armor wires employed as electrical current return wires which provide paths to ground for downhole equipment or tools. The invention enables the use of armor wires for current return while minimizing electric shock hazard. In some embodiments, the polymeric material isolates at least one armor wire in the first layer of armor wires thus enabling their use as electric current return wires.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about a to about b," or, equivalently, "from approximately a to b,") or, equivalently, "from approximately a-b") disclosed herein is to be understood as referring to the power set (the set of all subsets) of the respective range of values. Accordingly, the protection sought herein is as set forth in the claims below.

We claim:

1. A wellbore heating apparatus comprising:
   a cable comprising one or more loops of electrical conductor running the length of the cable, the cable having an upper section comprising a copper electrical conductor and a lower section comprising a steel electrical conductor in which the steel electrical conductor is arranged in the lower section to dissipate more heat per unit length of cable than in the upper section; and
   control equipment for controlling heating of the wellbore by supplying a designed range of currents to the loops of electrical conductor, the currents creating heat within the loops of electrical conductor, the heat being dissipated into the surrounding wellbore structure and into the surrounding formations along the length of the cable.

2. The wellbore heating apparatus of claim 1 further comprising:
   an upper section wherein the electrical conductors are sized, insulated and applied at a lay angle such that they dissipate a low amount of heat when a designed range of current is applied; and
   a lower section wherein the electrical conductors are sized, insulated and applied at a lay angle that is higher than the lay angle of the conductors in the upper section such that they dissipate a large amount of heat compared with the upper section when the designed range of current is applied.

3. A wellbore heating apparatus comprising:
   a cable comprising one or more loops of electrical conductor running the length of the cable;
   control equipment for controlling heating of the wellbore by supplying a designed range of currents to the loops of electrical conductor, the currents creating heat within the loops of electrical conductor, the heat being dissipated into the surrounding wellbore structure and into the surrounding formations along the length of the cable;
   an upper section wherein the electrical conductors are sized, insulated and applied at a lay angle such that they dissipate a low amount of heat when a designed range of current is applied; and
   a lower section wherein the electrical conductors are sized, insulated and applied at a lay angle that is higher than the lay angle of the conductors in the upper section such that they dissipate a large amount of heat compared with the upper section when the designed range of current is applied, wherein the electrical conductors in the lower section have an electrical resistivity of between 10 and 100 times greater than the electrical resistivity of the electrical conductors in the upper section.

4. A wellbore heating apparatus comprising:
   a cable comprising one or more loops of electrical conductor running the length of the cable; and
   control equipment for controlling heating of the wellbore by supplying a designed range of currents to the loops of electrical conductor, the currents creating heat within the loops of electrical conductor, the heat being dissipated into the surrounding wellbore structure and into the surrounding formations along the length of the cable, wherein the one or more loops of electrical conductors comprises:
   an outer layer of electrical conductors for carrying an electrical current down the cable; and
   an inner layer of electrical conductors for carrying the current up the cable, said inner layer of electrical conductors being sized, insulated and applied at a lay angle such that they dissipate a low amount of heat when a designed range of current is applied.

5. The wellbore heating apparatus of claim 4 further comprising:
   an upper section wherein the outer layer of electrical conductors are sized, insulated and applied at a lay angle such that they dissipate a low amount of heat when the designed range of current is applied; and
   a lower section wherein the outer layer of electrical conductors are sized, insulated and applied at a lay angle that is higher than the lay angle of the conductors in the upper section such that they dissipate a large amount of heat compared with the upper section when the designed range of current is applied.

6. The wellbore heating apparatus of claim 5 wherein the electrical conductors in the lower section have an electrical resistivity of between 10 and 100 times greater than the electrical resistivity of the electrical conductors in the outer layer of the upper section and the electrical conductors in the inner layer.

7. The wellbore heating apparatus of claim 5 wherein:
   the inner layer of electrical conductors and the outer layer of electrical conductors in the upper section are copper; and
   the outer layer of electrical conductors in the lower section are steel.

8. The wellbore heating apparatus of claim 1 further comprising:
   one or more optical fibers running the length of the cable that are disposed within a steel tube with a filler material; and
   control equipment for detection of temperatures along the optical fibers wherein the optical fibers are subjected to laser light and a plurality of Raman and Brilluoin scattering images from the light pulses are evaluated to determine the temperature of the wellbore along the length of the cable.

9. The wellbore heating apparatus of claim 8 wherein the filler is a polyolefin.

10. The wellbore heating apparatus of claim 9 wherein the cable is constructed such that the length of the optical fiber disposed within a given span of steel tube is longer than the length of the span of steel tube.

11. The wellbore heating apparatus of claim 10 wherein the one or more optical fibers comprises two loops of optical fiber.

12. The wellbore heating apparatus of claim 1 wherein an outer layer of the cable comprises:
   steel wires to provide strength and mechanical stability to the cable; and
   a polymer jacket to protect the cable and provide a scuff resistant coating.

13. The wellbore heating apparatus of claim 12 wherein the polymer jacket is composed of a material that bonds to a concrete in a cased wellbore.

* * * * *